United States Patent [19]

Dassoulas

[11] Patent Number: 5,794,352
[45] Date of Patent: Aug. 18, 1998

[54] SAW BLADE CLAMPING ARRANGEMENT FOR A POWER TOOL

[75] Inventor: Stephen C. Dassoulas, Baltimore, Md.

[73] Assignee: Black & Decker Inc., Newark, Del.

[21] Appl. No.: 744,023

[22] Filed: Nov. 5, 1996

Related U.S. Application Data

[63] Continuation-in-part of Ser. No. 504,050, Jun. 9, 1995, Pat. No. 5,647,133.

[51] Int. Cl.⁶ ............................................. B27D 19/02
[52] U.S. Cl. ................................................ 30/392; 279/79
[58] Field of Search ........................... 30/392–394, 338; 279/79

[56] References Cited

U.S. PATENT DOCUMENTS

| | | |
|---|---|---|
| 1,578,475 | 3/1926 | Sideman . |
| 2,101,362 | 3/1937 | Davidson . |
| 2,539,574 | 1/1951 | Fulmer . |
| 3,542,097 | 11/1970 | Dubek . |
| 3,555,678 | 1/1971 | Agulnick . |
| 3,823,473 | 7/1974 | Hoffman . |
| 4,020,555 | 5/1977 | Hedrick . |
| 4,106,181 | 8/1978 | Mattchen . |
| 4,243,342 | 1/1981 | Marto ................................ 403/324 |
| 4,294,013 | 10/1981 | Krieg . |
| 4,441,255 | 4/1984 | Hoffman . |
| 4,470,196 | 9/1984 | Hoffman . |
| 4,528,753 | 7/1985 | Kuhlman . |
| 4,594,781 | 6/1986 | Hoffman . |
| 4,601,477 | 7/1986 | Barrett et al. . |
| 4,648,182 | 3/1987 | Hoffman . |
| 5,103,565 | 4/1992 | Holzer, Jr. . |
| 5,165,173 | 11/1992 | Miller ................................ 30/394 X |
| 5,263,972 | 11/1993 | Evans et al. . |
| 5,306,025 | 4/1994 | Langoff . |
| 5,322,302 | 6/1994 | Quirijnen . |
| 5,324,052 | 6/1994 | Ortmann . |
| 5,443,276 | 8/1995 | Nasser et al. . |
| 5,458,346 | 10/1995 | Briggs . |
| 5,487,221 | 1/1996 | Oda et al. ........................... 30/392 |
| 5,575,071 | 11/1996 | Phillips et al. ..................... 30/392 |

FOREIGN PATENT DOCUMENTS

| | | |
|---|---|---|
| 195 43 247 | 11/1995 | Germany . |
| WO 95/27583 | 10/1995 | WIPO . |

*Primary Examiner*—Douglas D. Watts
*Attorney, Agent, or Firm*—Harness, Dickey & Pierce, P.L.C.

[57] ABSTRACT

A saw blade clamping arrangement particularly for power reciprocating saws and similar tools having a reciprocating shaft connected to a cutting member includes a biasing member preferably in the form of a spring clamp member. The biasing member is interconnected with the drive shaft and operative for providing a biasing force to retain the cutting member in operative connection with the drive shaft. A release lever is pivotally mounted to a housing of the saw for movement between first and second stable position. In the first position the release lever is spaced apart from the biasing member. In the second position the release lever engages the biasing member and opposes the biasing force of the biasing member to permit quick and easy removal and replacement of the saw blade. In one preferred embodiment, the spring clamp member biases the saw blade into operative engagement with the drive shaft. In a second preferred embodiment, the spring clamp member biases a locking member into engagement with the saw blade.

20 Claims, 5 Drawing Sheets

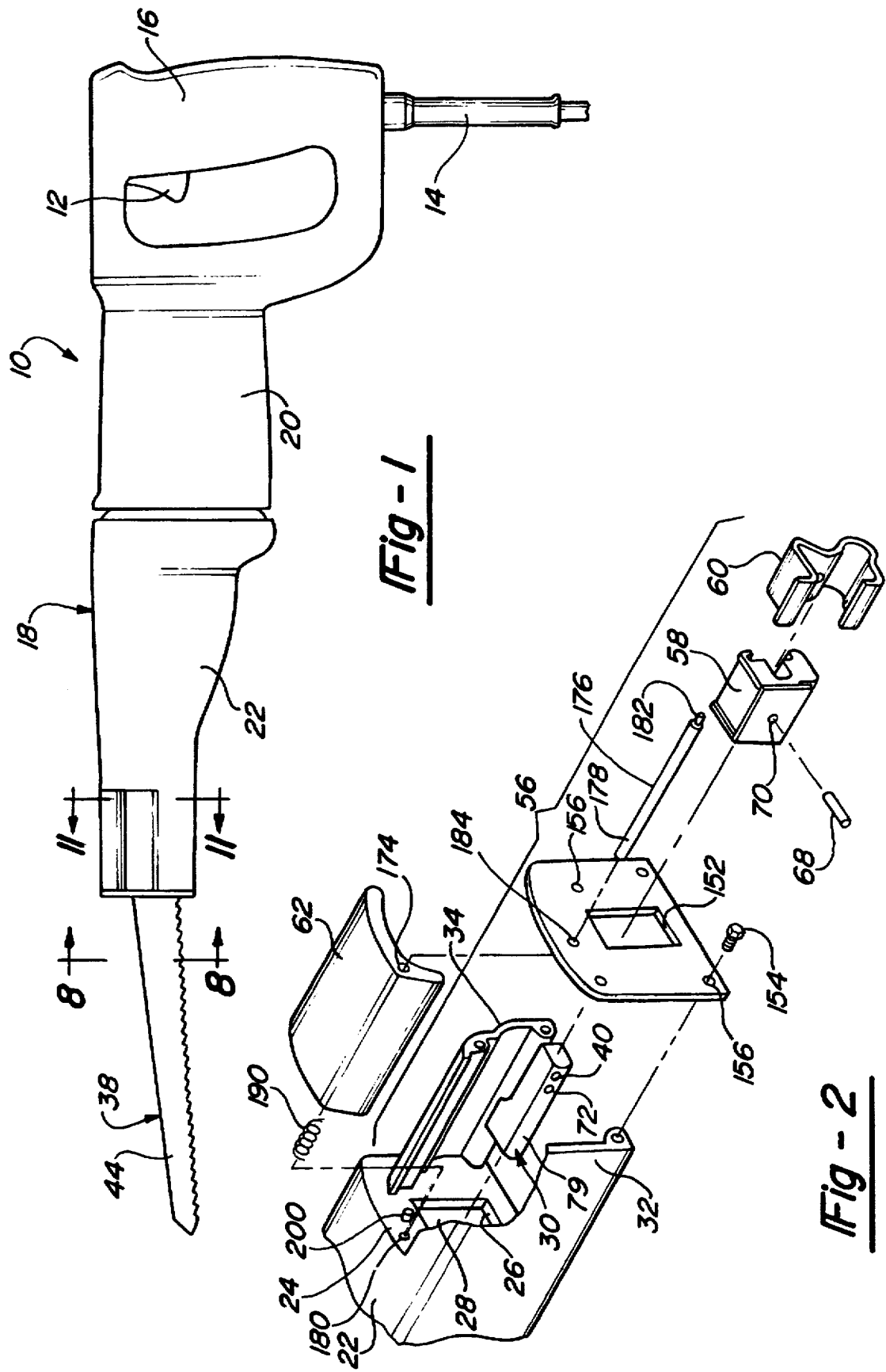

SAW BLADE CLAMPING ARRANGEMENT FOR A POWER TOOL

CROSS-REFERENCE TO RELATED APPLICATION

This is a continuation-in-part application of U.S. Ser. No. 08/504,050, filed Jun. 9, 1995, now U.S. Pat. No. 5,647,133.

BACKGROUND OF THE INVENTION

1. Field of the Invention

The present invention relates in general to power tools. In particular, the present invention relates to a saw blade clamping arrangement for a power tool having a saw blade mounted for reciprocating cutting motion.

2. Discussion

Power reciprocating saws include jigsaws and other reciprocating saws generally referred to in the trade as "recip" saws. These saws incorporate reciprocating shafts for driving generally linear saw blades along a predetermined path so as to provide one of a rectilinear or orbital cutting action.

In a conventional manner, the saw blades used with such power tools are attached to the reciprocating drive shafts through a blade holder having a slot for receiving the saw blade and a set screw which is received in a hole in the blade. The blade is clamped in place relative to the reciprocating drive shaft through tightening of the set screw. While this manner of saw blade attachment has proven to be generally satisfactory and commercially successful, it is not without inherent disadvantages.

For example, power reciprocating saws are subject to high vibration forces during operation which frequently result in loosening of the set screw. If the set screw does not remain sufficiently tightened, the saw blade may become disengaged from the drive shaft. An additional disadvantage with the conventional mounting of saw blades to reciprocating drive shafts relates to an inability to quickly and easily remove saw blades which become worn or fractured. Because it is often desirable to cut a workpiece with minimum material loss, it is desirable to correspondingly minimize the saw blade thickness. As a result, breakage due to the forces encountered during typical use is not an uncommon occurrence. This potential frequency of blade changing makes the ease and rapidity of such action desirable. A further disadvantage of conventional blade mounting arrangements is the necessity for a separate tool such as a wrench for fixation and removal of the saw blade.

Many previous attempts have been made to overcome the disadvantages associated with the above-described conventional mounting of saw blades through elimination of the use of a set screw. One example of such a saw blade mounting arrangement is shown in U.S. Pat. No. 5,322,302. The saw blade mounting arrangement described in this patent includes a mounting body which urges a clamping sphere through the biasing force of a spring into clamping engagement with a saw blade. Removal of the saw blade is facilitated through actuation of a lever which serves to overcome the biasing force exerted by the spring. Operation of this device requires a first of the operator's hands to actuate the lever and a second of the operator's hands for removal or installation of the saw blade. In other words, the actuating lever of this device is not movable to a stable, non-clamping position and necessarily requires two-handed operation—an action which is not always convenient.

Other previous attempts to secure saw blades to a reciprocating drive shaft of a power tool without the conventional use of a set screw are shown in U.S. Pat. Nos. 3,542,097; 3,823,473; 4,020,555; 4,106,181; 4,441,255; 4,594,781; 4,470,196; 4,528,753; 4,601,477; 4,648,182; 5,113,565; 5,263,972; and 5,324,052.

In general, each of the devices shown in these patents represents an attempt to overcome one or more of the disadvantages associated with conventional set screw attachment of a saw blade to a reciprocating drive shaft, including but not limited to the disadvantages discussed above. However, all of these devices are subject to further refinement and improvement. For example, many of the devices, including U.S. Pat. No. 5,322,302, disadvantageously require two-handed operation. Additionally, most of the devices shown in these patents are complicated and expensive to manufacture and assemble as a result of a construction including many separate parts. Further, operation of many of the prior devices requires application of force which is often significant for securing the saw blade in place and loosening of the blade for separation from the drive shaft. Achieving a sufficient force often requires the use of a wrench or other tool. Other disadvantages associated with these prior devices include an inability to cooperate with conventionally shaped saw blades.

SUMMARY OF THE INVENTION

The present invention comprises an improvement over prior known blade mounting arrangements for power tools, including those disclosed in the aforementioned patents. More particularly, the present invention provides a new and improved saw blade mounting arrangement for a power reciprocating saw which includes a release lever operative to permit quick and easy installation and removal of a saw blade. In each of the two preferred embodiments which will be described in detail below, the release lever is pivotally mounted for movement between two stable positions. Further in the preferred embodiments, the release lever is not interconnected with the drive shaft for reciprocating movement therewith.

Rather, the release lever is pivotally attached to the housing, thereby reducing the mass carried by the reciprocating shaft. Advantageously, the present invention provides a power reciprocating saw in which the saw blade can be mounted in place and detached using only a single hand. Additionally, the present invention provides a saw blade mounting arrangement for a power reciprocating saw of simple construction which is relatively inexpensive to manufacture and assemble. Furthermore, the present invention provides a blade mounting arrangement which can accommodate conventional saw blades of various constructions and which can hold the saw blade in place without the use of set screws and without the need to employ any other form of a tool. Still yet, the present invention provides a blade mounting arrangement having a design which protects its components from excessive wear and premature failure.

The present invention provides a saw blade clamping arrangement for a power tool of the type including a housing, a drive shaft mounted for reciprocating motion relative to the housing, and a saw blade releasably interconnected with the drive shaft. The saw blade clamping arrangement includes a biasing member and an actuation member. The biasing member is interconnected to the drive shaft for exerting a biasing force to retain operative connection between the saw blade and the drive shaft. The actuation member is selectively moveable between a first position and a second position. The first position permits the biasing force of the biasing member to retain the operating connection between the saw blade and the drive shaft. The second position causes the actuation member to overcome the biasing force, thereby permitting removal of the saw blade from the drive shaft.

In a first preferred embodiment, the present invention provides a power reciprocating saw having a gear case housing and a drive shaft mounted to the reciprocating saw for reciprocating motion relative to the gear case housing. A saw blade is releasably interconnected to the drive shaft for movement therewith. The power reciprocating saw further includes a clamping arrangement for mounting the saw blade to the drive shaft which includes a clamp support member, a spring clamp member and a release lever. The clamp support member is attached to the drive shaft for movement therewith. The spring clamp member is supported by the clamp support member and operates to retain the saw blade against the drive shaft. The release lever is pivotally attached to the housing for pivotal movement in a first direction about a pivot axis from a first stable position to a second stable position. In the first stable position, the spring clamp member exerts a biasing force to retain the saw blade in operative engagement with the drive shaft. In the second stable position, the release lever operates to overcome the biasing force of the spring clamp member to permit removal of the saw blade from the drive shaft.

In a second preferred embodiment, the present invention provides a power reciprocating saw having a gear case housing and a drive shaft mounted to the reciprocating saw for reciprocating motion relative to the gear case housing. A saw blade is releasably interconnected to the drive shaft for movement therewith. The power reciprocating saw further includes a clamping arrangement for mounting the saw blade to the drive shaft. The clamping arrangement preferably includes a clamp support member, a locking member, a spring clamp member and a release lever. The clamp support member is interconnected with the drive shaft for movement therewith and includes a longitudinal slot for receiving the saw blade and a transversely disposed aperture intersecting the longitudinal slot. The locking member is selectively engageable with the saw blade to operatively interconnect the saw blade to the drive shaft and extends at least partially into the transversely disposed aperture of the clamp support member. The spring clamp member is supported by the clamp support member and biases the locking member into engagement with the saw blade. The release lever is pivotally attached to the housing for pivotal movement between a first position in which the locking member is engaged with the saw blade and a second position in which the locking member is disengaged from the saw blade.

BRIEF DESCRIPTION OF THE DRAWINGS

Additional objects and advantages of the present invention will become apparent from a reading of the following detailed description of the preferred embodiments which makes reference to the drawings of which:

FIG. 1 is a side elevational view of a reciprocating saw incorporating a saw blade clamping arrangement constructed in accordance with the teachings of a first preferred embodiment of the present invention;

FIG. 2 is an exploded perspective view of the saw blade clamping arrangement of the present invention;

DETAILED DESCRIPTION OF THE PREFERRED EMBODIMENTS

Figure 3:
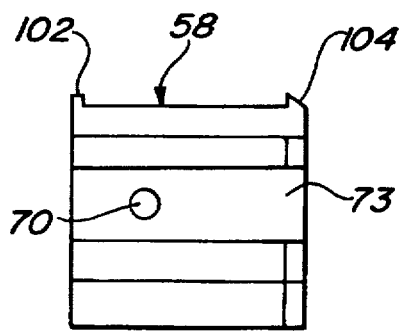
FIG. 3 is an enlarged side view of the clamp support member shown in FIG. 2.

The present invention provides an improved saw blade clamping arrangement for a power tool. While shown throughout the drawings in a saw blade clamping arrangement specifically adapted for a reciprocating saw, those skilled in the art will appreciate that the invention is not so limited in scope. In this regard, the teachings of the present invention will be understood to be readily adaptable for use with any power tool incorporating one or more reciprocating cutting members (e.g., reciprocating saws, jig saws, various surgical saws and culinary knives, etc.).

Turning generally to the drawings in which identical or equivalent elements have been denoted with like reference numerals, and specifically to FIGS. 1 through 12 thereof, a first preferred embodiment of an exemplary power tool is shown. The exemplary power tool embodies the teachings of the present invention and is illustrated in FIG. 1 as a power reciprocating saw which has been identified generally at reference numeral 10. In a conventional manner, power reciprocating saw 10 is powered by a motor (not shown) that is actuated by a trigger switch 12. The delivery of electrical energy to the motor through a power cord (partially shown at 14) is controlled by trigger switch 12.

In the exemplary embodiment illustrated, power tool 10 is shown to include a handle portion 16 which carries trigger switch 12. Power tool 10 is also shown to include a housing 18 that includes a centrally located motor housing portion 20 and a forwardly located gear case housing portion 22. As shown most clearly in FIG. 2, gear case housing portion 22 is formed to include a front face 24 having a generally rectangular aperture 26 which defines the opening of a longitudinally extending drive shaft channel 28.

Power tool 10 further includes a drive shaft 30 partially extending within drive shaft channel 28 and operatively connected with a drive mechanism (not shown) housed within gear case housing portion 22. This interconnection between the drive mechanism and drive shaft 30 can be in any manner well known in the art. Drive shaft 30 is mounted for reciprocating motion generally along the longitudinal axis defined by power tool 10.

As shown in FIGS. 1 and 2, the housing 18 includes first and second forwardly extending sidewall members 32 and 34 interconnected with gear case housing portion 22. In the first preferred embodiment, first and second forwardly extending side wall members 32 and 34 are integrally formed with gear case housing 22 and are constructed of aluminum, magnesium or other suitable lightweight metal. The particular configuration and function of first and second forwardly extending sidewall members 32 and 34 will be described in detail below.

Drive shaft 30 is adapted to cooperate with a cutting member such as a saw blade 38 for driving the saw blade 38 back and forth in a cutting motion along a rectilinear path. In this regard, reciprocating drive shaft 30 is formed to include a transversely extending aperture 40 for receiving a drive pin 42 (shown in FIG. 7).

An interference fit retains drive pin 42 within aperture 40. The saw blade construction shown in FIGS. 1 and 7 conventionally includes a forwardly located cutting portion 44 integrally formed with a rearwardly located mounting portion 46. In a manner well known in the art, an aperture 48 formed in mounting portion 46 of saw blade 38 receives drive pin 42 when saw blade 38 is mounted to reciprocating drive shaft 30. The exposed end of drive pin 42 extends from a first side wall 52 (shown in FIG. 8) of reciprocating shaft 30 in a dimension approximately equivalent to the thickness of saw blade 38.

Power tool 10 of the present invention further includes a clamping arrangement 56 for releasably maintaining saw blade 38 in operative connection with reciprocating drive shaft 30. Clamping arrangement 56 is shown throughout the drawings to include a clamp support member 58, a biasing member 60, and a actuation member 62. The remainder of this detailed description of the first preferred embodiment will be primarily directed to the construction and operation of clamping arrangement 56 which is the focus of the present invention.

Figure 4:
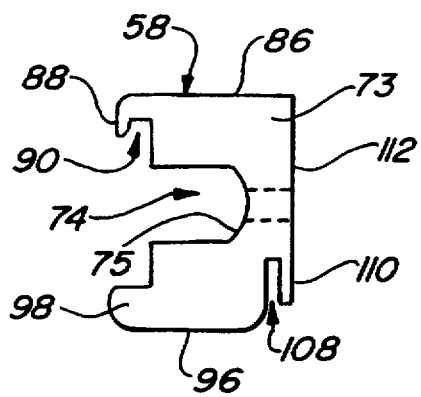
FIG. 4 is an enlarged end view of the clamp support member.
Figure 5:
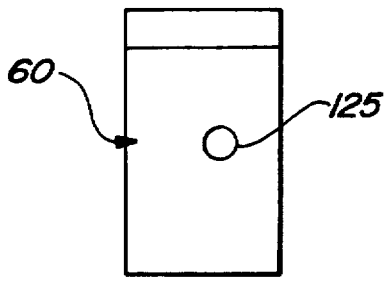
FIG. 5 is an enlarged side view of the clamp spring member shown in FIG. 2.

Referring specifically to FIGS. 3 and 4, the construction and operation of the clamp support member 58 will be described. In the exemplary embodiment shown throughout the drawings, clamp support member 58 is illustrated as a separate element which is adapted to be interconnected with reciprocating drive shaft 30 for movement therewith. However, it will be appreciated by those skilled in the art that clamp support member 58 and drive shaft 30 may alternatively be integrally formed as a single component. Clamp support member 58 is unitarily constructed of a hardened steel or other suitable material. Interconnection between clamp support members 58 and drive shaft 30 is established through a roll pin 68 in interference fit engagement with a transversely extending aperture 70 passing through clamp support member 58 and a corresponding aperture 72 disposed in reciprocating drive shaft 30.

Figure 11:
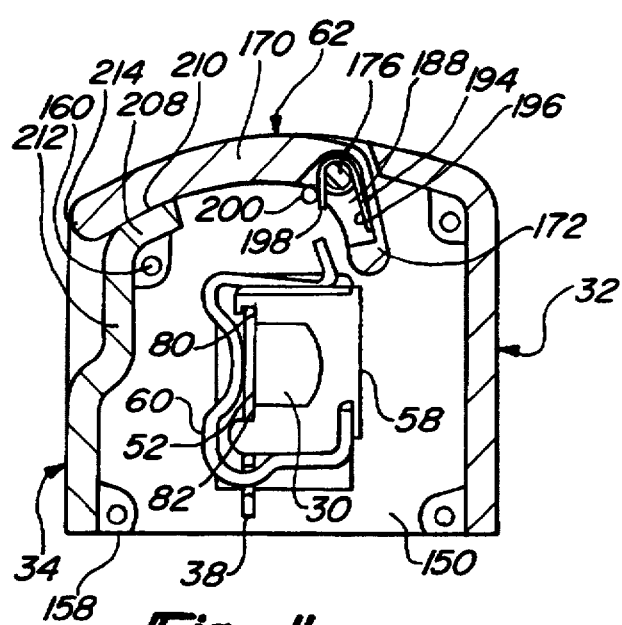
FIG. 11 is a cross-sectional view of the clamping assembly of FIG. 1 taken along the line 11—11 of FIG. 1, illustrating the release lever rotated to a first stable position in which the clamp spring member of the clamping assembly biases the saw blade into operative connection with the drive shaft.
Figure 12:
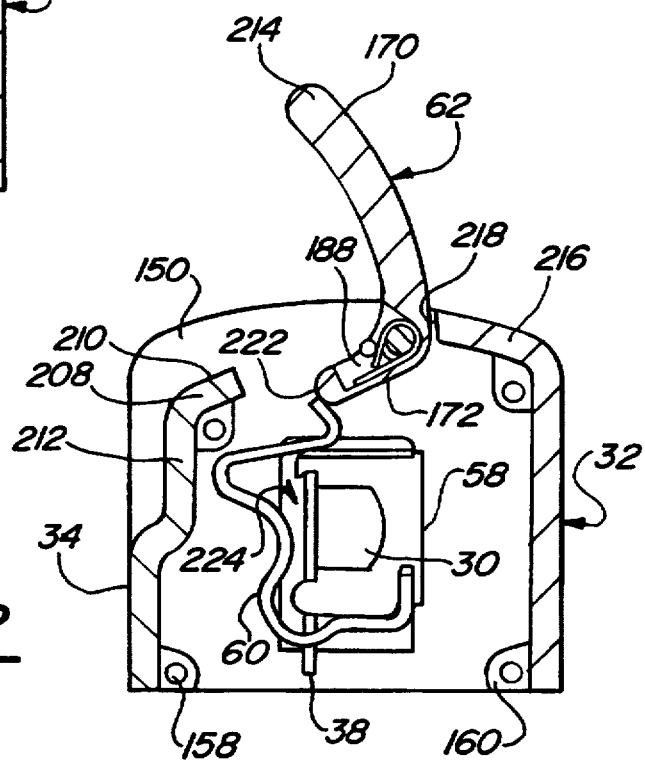
FIG. 12 is a cross-sectional view similar to that shown in FIG. 11, illustrating the release lever in a second stable position in which the clamp spring member is displaced from the saw blade by the release lever, thereby permitting the saw blade to be easily removed from the clamp assembly.

Clamp support member 58 includes a main body portion 73 which partially defines a longitudinally extending channel 74 sized to receive reciprocating drive shaft 30. More particularly, the longitudinal channel 74 is defined by an inner wall 75 and by first and second opposing side walls 76 and 78 which each terminate at end walls 80 and 82, respectively. Inner wall 75 is concavely curved to receive a second side wall 79 of reciprocating drive shaft 30. In the first preferred embodiment, a first side wall 52 of reciprocating drive shaft 30 is adapted to sit flush with end walls 80 and 82 (as shown in FIGS. 11 and 12). End walls 80 and 82 cooperate with first side wall 52 to provide a surface against which saw blade 38 is disposed when operatively connected with power tool 10.

Adjacent an upper surface 86, clamp support member 58 is formed to integrally include an L-shaped flange 88 which partially defines a channel 90 for receiving an upper surface 94 of saw blade 38. Adjacent a lower surface 96, clamp support member 58 includes an outwardly extending portion 98 adapted to abut a lower surface 100 of saw blade 38. Upper surface 86 of clamp support member 58 includes a pair of spaced, upwardly extending flange portions 102 and 104. As will be appreciated below, flange portions 102 and 104 cooperate to limit longitudinal movement of biasing member 60. A second transversely extending channel 108 is partially defined between the main body portion 73 of clamp support member 58 and a downwardly extending portion 110 of a rear wall 112 of clamp support 58. Channel 108 is open along a bottom side.

Figure 6:
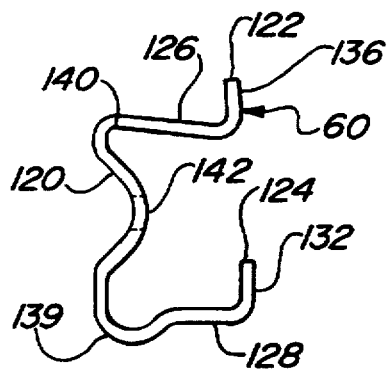
FIG. 6 is an enlarged end view of the clamp spring member.
Figure 7:
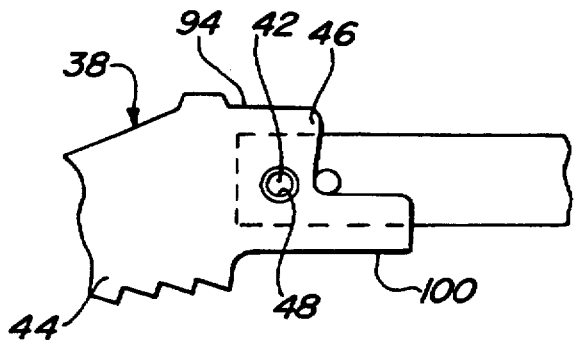
FIG. 7 is a partial side view of the saw blade clamping arrangement of FIG. 1, illustrating interconnection of the drive shaft with a conventional saw blade.
Figure 8:
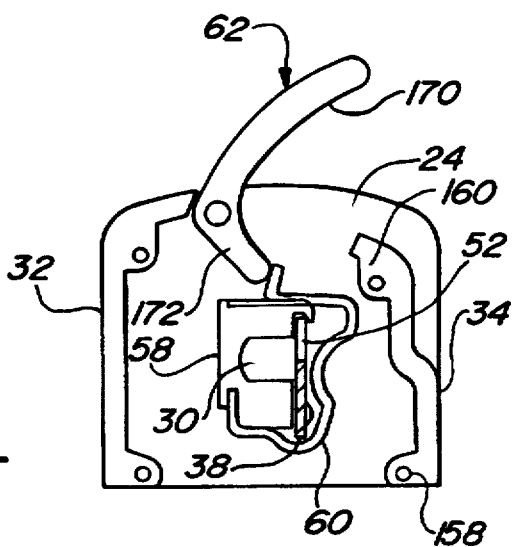
FIG. 8 is a partial cross-sectional view of the keyless saw blade clamp of FIG. 1 taken along the line 8—8 of FIG. 1 illustrated with the end plate of FIG. 2 removed for purposes of clarity.

Referring specifically to FIG. 6, the biasing member of the present invention is preferably illustrated as a spring clamp member 60. Spring clamp member 60 is adapted to be directly carried by clamp support member 58 for movement with reciprocating drive shaft 30. Spring clamp member 60 is generally C-shaped and is integrally formed of a resilient metal or other suitable material to include a curvilinear central portion 120 and first and second ends 122 and 124. In one application, spring clamp member 60 is constructed of 0.050 inch steel. A side view of clamp spring member 60 is shown in FIG. 6 in a substantially unloaded condition. An aperture 125 passes through central portion 120 which is adapted to accept an end of drive pin 42 when a saw blade is not in clamping arrangement 56.

Clamp spring member 60 further includes generally linear upper and lower segments 126 and 128 integrally attached to opposite ends of curvilinear central portion 120. Upper and lower segments 126 and 128 are disposed generally transverse to curvilinear central portion 120 and cooperate with the curvilinear central portion 120 to partially define a longitudinally extending opening 130 for receiving a portion of clamp support member 58 and reciprocal drive shaft 30.

Spring clamp member 60 is further shown to include a retaining portion 132 adjacent second end 124 which is adapted to be constrained within longitudinal channel 108 of clamp support member 58. Spring clamp member 60 further integrally includes a spring tab portion 136 adjacent first end 122 which extends upwardly relative to upper segment 126 and is angled slightly rearwardly in the direction of curvilinear central portion 120. Spring tab portion 136 is free from direct constraint with respect to clamp support member 58.

When assembled and in clamping engagement with drive shaft 30 and saw blade 38, lower segment 128 of spring clamp member 60 is positioned adjacent bottom surface 96 of clamp support member 58. In an unloaded condition, upper segment 126 of spring clamp member 60 is arranged to be positioned substantially adjacent upper surface 86 of clamp support member 58. As discussed above, longitudinal translation of spring clamp member 60 is limited by flange portions 102 and 104 of clamp support member 58.

Curvilinear central portion 120 includes a lower, outwardly curved segment 139 which accommodates saw blade 38 and an upper, outwardly curved segment 140. Curvilinear central portion 120 further includes an inwardly curved central portion 142 arranged to directly contact saw blade 38. It will be appreciated by those skilled in the art that the particular construction of spring clamp 60 is subject to modification without departing from the scope of the present invention. Any construction will be suitable which incorporates a portion for fixation to clamp support member 58, a portion for directly biasing saw blade 38 and a displaceable free end.

While in a clamping position such as that shown in FIG. 11, clamp spring member 60 functions to exert a biasing force against saw blade 38 through contact of central portion 142 and saw blade 38. The biasing force serves to retain saw blade 38 in operative connection with reciprocating drive shaft 30 by preventing saw blade 38 from moving transversely with respect to drive shaft 30.

Figure 9:
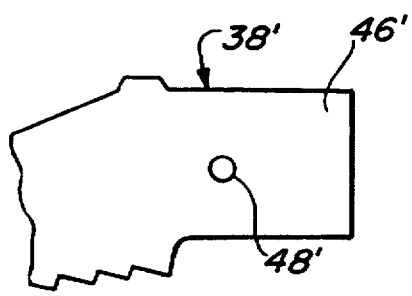
FIG. 9 is a partial view of a mounting portion of a first alternative saw blade configuration acceptable for use with the saw blade clamping arrangement of the present invention.
Figure 10:
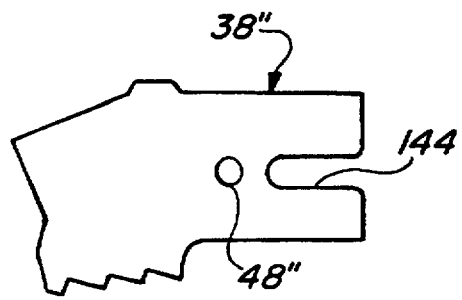
FIG. 10 is a partial view of a mounting portion of a second alternative saw blade configuration acceptable for use with the keyless saw blade clamping arrangement of the present invention.

It will be appreciated by those skilled in the art that clamping arrangement 56 of the present invention is able to accommodate saw blades of various configurations without modification. By way of example and not of limitation, two alternative saw blade constructions suitable for use with clamping arrangement 56 are illustrated in FIGS. 9 and 10. Referring to FIG. 9, a first alternative saw blade 38' includes a generally rectangular mounting portion 46' formed with an aperture 48' sized to receive drive pin 42. In FIG. 10, a second alternative saw blade 38" is shown to include an aperture 48" and a longitudinally extending slot 144. Any of a number of other known saw blade constructions may be releasably interconnected to drive shaft 30 through clamping arrangement 56 of the present invention.

As shown throughout the drawings, actuation member of the present invention is preferably illustrated as a release lever 62 operative to overcome the biasing force of spring clamp member 60 and thereby facilitate removal and replacement of saw blade 38. In the exemplary embodiment illustrated, release lever 62 is mounted for pivotal movement between a first stable position or clamped position (shown in FIG. 11) and a second stable position or unclamped position (shown in FIG. 12). Significantly, when release lever 62 is in its first stable position, it is spaced apart from spring clamp member 60 permitting release lever 62 to remain longitudinally fixed with respect to housing 18. Thus, release lever 62 remains relatively stationary as reciprocating drive shaft 30 operates, thereby reducing the weight translated back and forth by drive shaft 30 and also reducing attendant vibration forces.

To facilitate pivotal mounting of release lever 62, power tool 10 further includes an end plate 150 interconnected with first and second forwardly extending sidewall members 32 and 34. As shown in FIG. 2, end plate 150 is generally planar and has a configuration similar to front face 24 of gear case housing 22. End plate 150 includes an aperture 152 through which saw blade 38 is permitted to pass. In the embodiment illustrated, end plate 150 is attached to first and second forwardly extending side wall members 32 and 34 by a plurality of threaded fasteners 154 adapted to pass through four apertures 156 provided in the end plate. Fasteners 154 are adapted to engage threaded holes 158 located in boss portions 160 on each of the forwardly extending side walls members 32 and 34. In the embodiment illustrated, boss portions 160 are located along the free ends of first and second forwardly extending side wall members 32 and 34. It will be appreciated by those skilled in the art that the end plate 150 can be alternatively attached to forwardly extending side wall members 32 and 34 in any of a number of other well known manners. In this regard, it is anticipated that end plate 150 could alternatively be welded to forwardly extending side walls members 32 and 34.

Release lever 62 has a generally L-shaped cross section including a first leg 170 and a second leg 172. The longitudinal length of release lever 62 is sufficient to extend along the entire travel path of spring clamp member 60 as drive shaft 30 is reciprocated. A longitudinally extending aperture 174 passes through the length of release lever 62 at the junction of first and second legs 170 and 172 and is adapted to receive a pivot pin 176. Pivot pin 176 includes a first end 178 adapted to engage an aperture 180 formed in front face 24 and a second end 182 adapted to engage an aperture 184 located in end plate 150. Second end 182 is of a reduced diameter so as to prevent forward translation of pin 176.

As shown in FIGS. 11 and 12, release lever 62 is formed to include a recess or pocket 188 configured to accommodate a torsion spring 190. Torsion spring 190 functions to bias release lever 62 towards its first stable position (as shown in FIG. 11) and includes a central portion surrounding an adjacent portion of pivot pin 176. Torsion spring 190 also includes a fixed end 194 in engagement with a boss portion 196 of recess 188. Torsion spring 190 further includes a free end 198 adapted to engage a stop pin 200 extending from front face 24 of gear case housing 22. Stop pin extends into recess 180 to avoid interference with release lever 62.

As shown most clearly in FIGS. 11 and 12, second forwardly extending wall member 34 is generally S-shaped in cross section and includes an upper segment 208 providing a stop surface 210 arranged to support release lever 62. Upper segment 208 serves to prevent further rotation of release lever 62 in a counterclockwise direction as shown in FIGS. 11 and 12. First leg 170 of release lever 62 transversely extends slightly beyond an upper vertical segment 212 of second forwardly extending wall member 34 so that the operator can grasp a free end 214 of first leg 170.

First forwardly extending side wall member 32 is generally L-shaped in cross-section and is formed along the perimeter of a corresponding portion of front face 24 of gear case housing 22. An upper segment 216 of second forwardly extending side wall member 34 terminates at a stop surface 218 for engaging release lever 62 when release lever 62 is rotated to its second stable position (as shown in FIG. 12).

Second leg 172 of release lever 62 includes an engagement surface 222 adapted to contact spring tab portion 136 of spring clamp member 60. As shown in FIG. 12, clockwise rotation of release lever 62 about a longitudinal pivot axis defined by pivot pin 176 results in contact between engagement surface 216 of second leg 172 and spring tab portion 136 of spring clamp member 60. The length of second leg 172 is significantly less than the length of first leg 170, thereby providing a mechanical advantage for overcoming the biasing force exerted by spring clamp member 60.

The pivot axis of release lever 62 defined by pivot pin 176 is disposed relative to engagement surface 222 of second leg 172 so as to provide an overcentered relationship therebetween. As a result, as release lever 62 approaches its second stable position (as shown in FIG. 12), the opposing biasing force of spring clamp member 60 urges release lever 62 against stop surface 218 of first forwardly extending wall portion 32.

With particular reference to FIGS. 11 and 12, the operation of the clamping arrangement 56 of the present invention heretofore detailed will now be described. Beginning with saw blade 38 operatively connected to reciprocating drive shaft 30, release lever 62 is rotated in a clockwise direction from its first stable position (shown in FIG. 11) by manual urging of first leg 170 to overcome the biasing force of torsion spring 190. Initial clockwise rotation causes second leg 172 of release lever 62 to engage spring tab portion 136 of spring clamp member 62.

Continued clockwise rotation of release lever 62 serves to transversely displace spring tab portion 136 and to overcome the biasing force of spring clamp member 62 by elastically deforming the spring clamp member 60. More specifically, elastic displacement of spring tab portion 136 creates a gap 224 between curvilinear central portion 120 of spring clamp member 60 and saw blade 38. As release lever 62 approaches its second stable position, the over-centered relation between engagement surface 222 of second leg 172 and the pivot axis defined by pivot pin 176 causes the biasing force of spring clamp member 60 to further urge release lever 62 in a clockwise direction against stop surface 218. At this point, release lever 62 will stay in its second stable position until urged in the direction of its first stable position. As a result, both of the operator' hands are free for handling replacement of saw blade 38 or other necessary tasks.

Saw blade 38 can now be removed from power tool 10 and a new blade can be inserted into gap 224 between spring clamp member 60 and reciprocating drive shaft 30. Upper edge 94 of saw blade 38 is located in channel 90 and aperture 48 is positioned over drive pin 42. Operating interconnection between saw blade 38 and reciprocating drive shaft 30 is established by manual urging of release lever 62 in a counterclockwise direction. Following initial counterclockwise movement of lever 62, the biasing force of spring clamp member 60 urges release lever 62 to its first stable position.

Turning now to FIGS. 13-19 of the drawings, a saw blade clamping arrangement 56' constructed in accordance with the second preferred embodiment of the present invention will now be described. In this second embodiment, components similar to those identified with respect to the first embodiment will be designated in the drawings with corresponding reference numerals. As with the first preferred embodiment, saw blade clamping arrangement 56' is operative for use with power tool 10 such as a reciprocating saw or other tool including a reciprocating drive shaft 30.

As with the first preferred embodiment of the present invention, the saw blade clamping arrangement 56' of the second preferred embodiment includes a clamp support member 58, a biasing member 60 and an actuation member 62. The saw blade clamping arrangement 56' of the second preferred embodiment departs from the first preferred embodiment in that it additionally incorporates a locking member 230 operative to selectively engage saw blade 38 and interconnect saw blade 38 to drive shaft 30. The remainder of this detailed description will address departures in construction and function of the second preferred embodiment from the first preferred embodiment.

Figure 13:
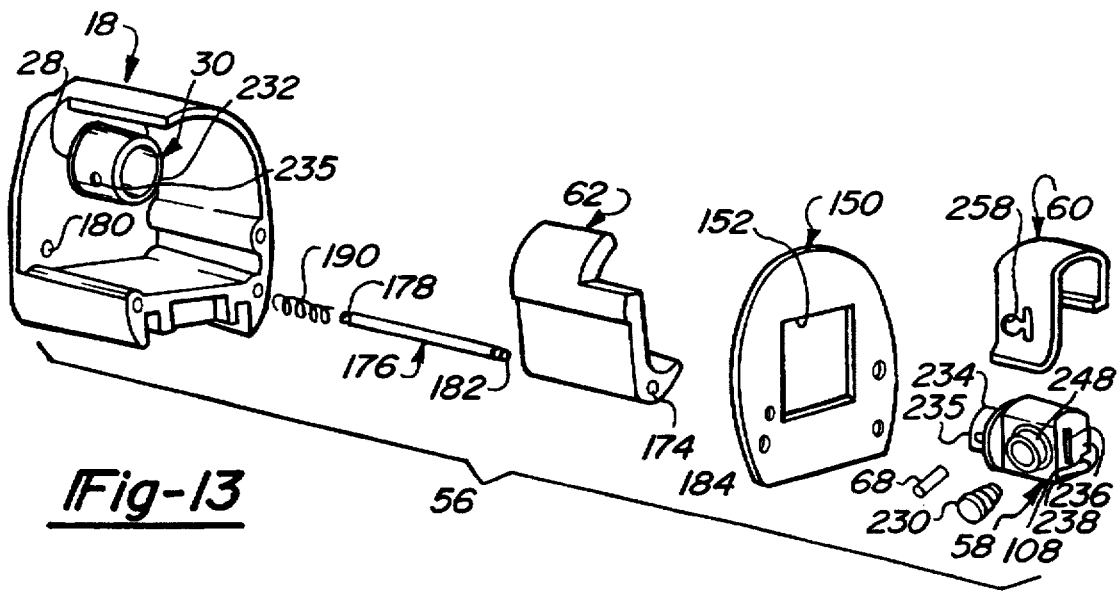
FIG. 13 is an exploded view of a saw blade clamping arrangement constructed in accordance with the teachings of a second preferred embodiment of the present invention and a portion of a reciprocating saw.

As shown in FIG. 13, drive shaft 30 of the second preferred embodiment is generally cylindrical and includes an open distal end 232 for receiving a first end 234 of clamp support member 58. In the exemplary embodiment illustrated, first end 234 of clamp support member 58 and drive shaft 30 are interconnected by pin 68 which engages cooperating apertures 235 located in first end 234 and shaft 30. However, it will be appreciated by those skilled in the art that any suitable manner may be utilized to fixedly interconnect clamp support member 58 with drive shaft 30. For example, clamp support member 58 and shaft 30 may alternatively be press fit together and brazed.

Figure 14:
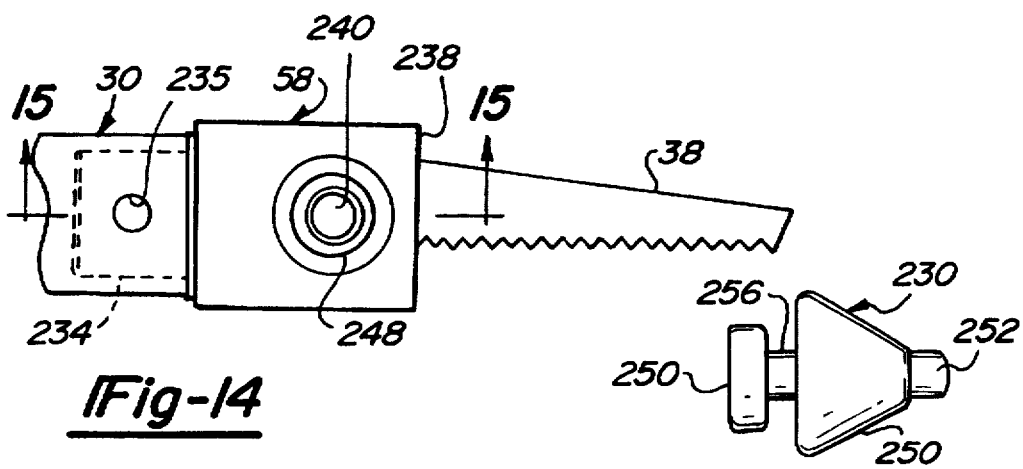
FIG. 14 is an enlarged side view of the clamp support member of the second preferred embodiment shown in FIG. 13.
Figure 15:
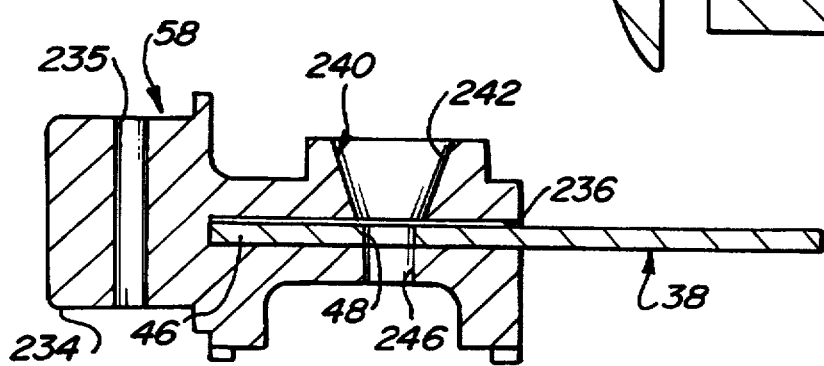
FIG. 15 is a cross-sectional view taken along the line 15—15 of FIG. 14.

With reference to FIGS. 14 and 15, clamp support member 58 is shown to include a generally rectangular channel 236 partially extending longitudinally therethrough. Rectangular channel 236 is open adjacent a second end 238, or distal end, of clamp support member 58 and is configured to receive mounting portion 46 of saw blade 38. Clamp support member 58 further includes a transversely extending recess 240 having a generally conical portion 242 and a reduced diameter cylindrical portion 246. Reduced diameter cylindrical portion 246 is arranged to align with aperture 48 in mounting portion 46 of saw blade 38 upon insertion of saw blade 38 into channel 236. Conical portion 242 is partially defined by an upwardly extending cylindrical flange 248. As will become apparent below, recess 240 is configured to cooperatively receive locking member 230.

Figure 16:
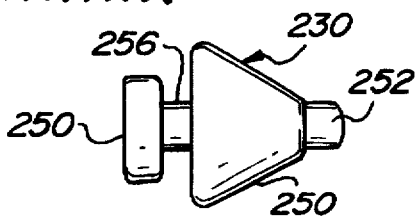
FIG. 16 is an enlarged side view of the locking pin member of the second embodiment shown in FIG. 13.

With continued reference to FIG. 13 and additional reference to FIG. 16, locking member 230 is shown to include a generally conical portion 250 configured to cooperate with conical portion 242 of recess 240. In a similar manner, locking member 230 includes a generally cylindrical portion 252 adapted for insertion into cylindrical portion 246 of recess 240. When locking member 230 is seated into recess 240 of clamp support member 58, cylindrical portion 252 intersects rectangular channel 236 and engages aperture 48 in mounting portion 46 of saw blade 30, thereby operatively interconnecting saw blade 30 with clamp support member 58. Locking member 230 is shown to further include a head 254 interconnected to conical portion 250 through a reduced diameter portion 256.

Figure 17:
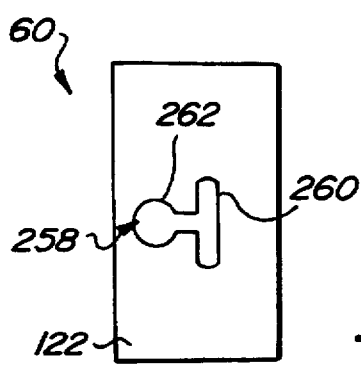
FIG. 17 is an enlarged side view of the spring clamp member of the second embodiment shown in FIG. 13.

With reference now to FIGS. 13 and 17, biasing member 60 of the second preferred embodiment will now be described. As with the first preferred embodiment, biasing member 60 of the second preferred embodiment is a spring clamp member 60 adapted to be directly carried by clamp support member 58 for movement with drive shaft 30. Spring clamp member 60 includes a first end 122 displaceable by actuation member 62 and a second end 124 constrained with respect to clamp support member 58. Second end 124 is constrained within longitudinal channel 108 of clamp support member 58. Spring clamp member 60 normally functions to bias locking member 230 to a seated position within recess 240 of clamp support member 58 and thereby operatively interconnect clamp support member 58 and saw blade 30.

As most clearly shown in FIG. 17, spring clamp member 60 includes an aperture 258 disposed adjacent first end 122. Aperture 258 includes a ted portion 260 interconnected to a circular portion 262. In use, head 254 of locking member 230 is inserted through circular portion 262 of aperture 258 and reduced diameter portion 256 of locking member 230 is positioned within elongated portion 260. As first end 122 of spring clamp member 60 is deflected by actuation member 62, reduced diameter portion 256 of locking member 230 is permitted to translate within elongated portion 260.

As with the first preferred embodiment, the release lever 62 of the second preferred embodiment is pivotally interconnected to housing 18 for movement between a first position and a second position. In this regard, pivot pin 176 passes through longitudinally extending aperture 174. First end 182 engages aperture 184 formed in cover plate 150. Similarly, second end 178 engages aperture 180.

Figure 18:
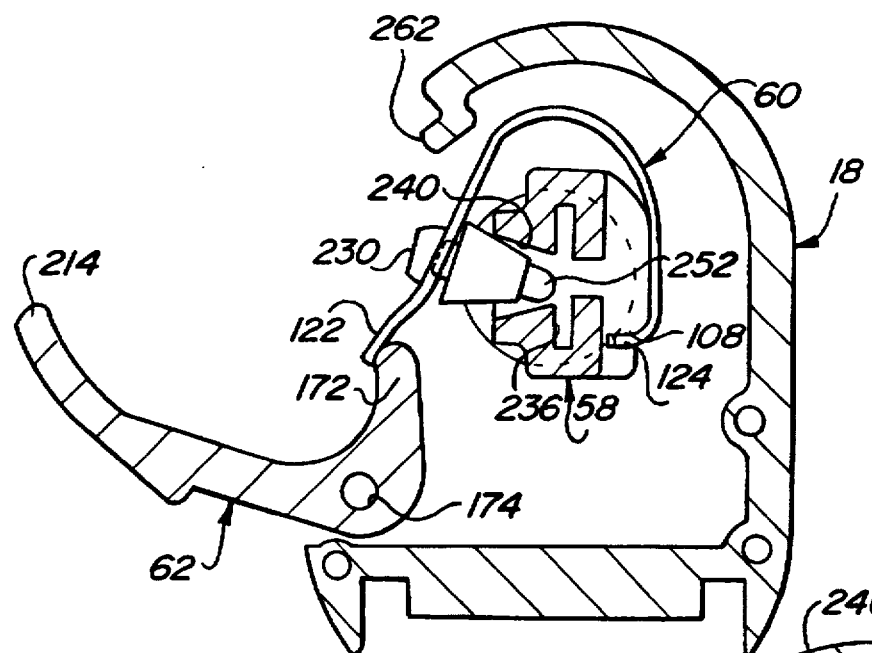
FIG. 18 is a partial cross-sectional view of the saw blade clamping arrangement of FIG. 13, illustrating the lever rotated to a first position in which the locking pin member is displaced from the slot which receives the saw blade, thereby permitting the saw blade to be easily removed or inserted from the clamp support member.
Figure 19:
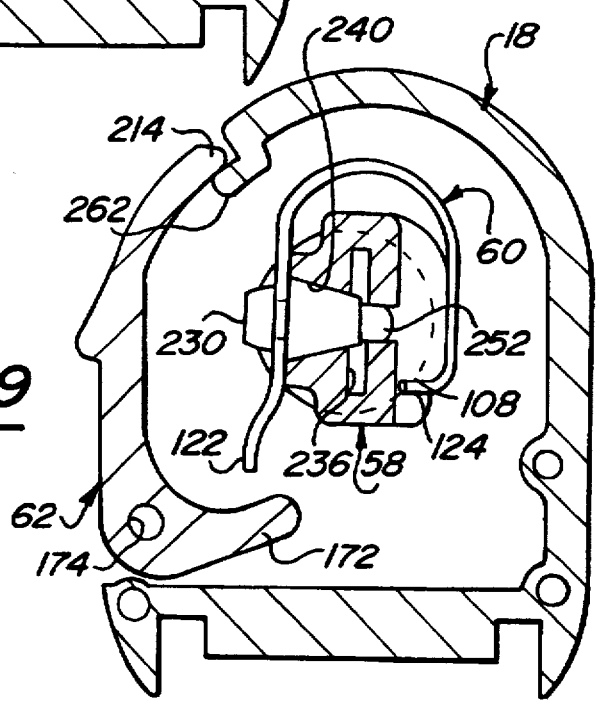
FIG. 19 is a partial cross-sectional view similar to that shown in FIG. 18, illustrating the release lever in a second position in which the clamp spring member biases the locking pin member into a locked position for retaining the saw blade within the slot.

In the first position (as shown in FIG. 19), release lever 62 is spaced apart from spring clamp member 60 and does not reciprocate with drive shaft 30. Free end 214 of release lever 62 abuts a lip 262 formed with housing 18 to prevent further rotation of release lever 62 in a clockwise direction as shown in the drawings. In its second position (as shown in FIG. 18), release lever 62 displaces first end 122 of spring clamp member 60, thereby partially removing locking member 230 from recess 240. As a result, cylindrical portion 252 is withdrawn from channel 236 and aperture 48 of saw blade 38, thereby permitting removal of saw blade 38.

While the above description constitutes two preferred embodiments of the invention, it will be appreciated that the invention is susceptible to modification, variation, and change without departing from the proper scope or fair meaning of the accompanying claims.

What is claimed is:

1. A saw blade clamping arrangement for a power tool of the type including a housing, a drive shaft mounted for reciprocating motion relative to the housing, and a saw blade releasably interconnected with the drive shaft, the saw blade clamping arrangement comprising:

a clamp support interconnected with the drive shaft;

a locking member selectively engageable with the saw blade to operatively interconnect the saw blade with the drive shaft;

an actuation member attached to the power tool, said actuation member moveable between a first position in which the locking member operatively interconnects the saw blade with the drive shaft and a second position in which the locking member permits displacement of the saw blade relative to the drive shaft; and a spring clamp member for biasing said locking member into engagement with the saw blade, said spring clamp member having a first end constrained with respect to said clamp support, a second end displaceable by said actuation member, and an elongated slot disposed adjacent said second end;

said locking member including a reduced diameter portion adapted to translate within said elongated slot as said second end is displaced by said actuation member.

2. The blade clamping arrangement of claim 1, wherein said actuation member is a release lever longitudinally fixed with respect to the housing, said release lever spaced apart from said biasing member when said release lever is in said first position.

3. The blade clamping arrangement of claim 2, wherein said release lever is mounted for pivotal movement about a pivot axis spaced apart from and parallel to the drive shaft.

4. The blade clamping arrangement of claim 1, wherein said locking member includes an end for selectively engaging the saw blade.

5. The blade clamping arrangement of claim 4, wherein said clamp support member includes a conical recess and further wherein said locking member includes a conical portion adapted to seat in said conical recess when said locking member is engaged with the saw blade.

6. A power reciprocating saw comprising:

a gear case housing;

a drive shaft mounted to the reciprocating saw for reciprocating motion relative to said gear case housing; and a clamping arrangement for mounting a saw blade to said drive shaft, said clamping arrangement including:

(a) a clamp support member interconnected with said drive shaft for movement therewith, said clamp support member including a longitudinal slot for receiving said saw blade and a transversely disposed aperture intersecting said longitudinal slot;

(b) a locking member selectively engageable with said saw blade to operatively interconnect said saw blade relative with said drive shaft, said locking member extending at least partially into said transversely disposed aperture of said clamp support member;

(c) a biasing member supported by said clamp support member biasing said locking member into engagement with said saw blade; and (d) an actuation member attached to said housing for movement between a first position in which said locking member is engaged with said saw blade and a second position in which said locking member is disengaged from said saw blade.

7. The power reciprocating saw of claim 6 wherein said locking member includes an end for selectively engaging the saw blade.

8. The power reciprocating saw of claim 7, wherein said clamp support member includes a conical recess and further wherein said locking member includes a conical portion adapted to seat in said conical recess when said locking member is engaged with the saw blade.

9. The power reciprocating saw of claim 6, wherein said biasing member includes a second end displaceable by said actuation member, said biasing member includes an elongated slot disposed adjacent said second end, and further wherein said locking member includes a reduced diameter portion adapted to translate with said elongated slot as said second end is displaced by said actuation member.

10. A saw blade clamping arrangement for a power tool of the type including a housing, a drive shaft mounted for reciprocating motion relative to the housing and a saw blade releasably interconnected with the drive shaft, the saw blade clamping arrangement comprising:

a clamp support member interconnected with the drive shaft for movement therewith, the clamp support member including a longitudinal slot for receiving the saw blade and a transversely disposed aperture intersecting the longitudinal slot;

a locking member selectively engageable with the saw blade to operatively interconnect the saw blade relative to the drive shaft, the locking member extending at least partially into said transversely disposed aperture of said clamp support member;

a biasing member supported by said clamp support member biasing said locking member into engagement with the saw blade; and an actuation member attached to the power tool, said actuation member movable between a first position in which said locking member operatively interconnects the saw blade with the drive shaft and a second position in which the locking member permits displacement of the saw blade relative to the drive shaft.

11. The saw blade clamping arrangement for a power tool of claim 10, wherein said locking member includes an end for selectively engaging the saw blade.

12. The saw blade clamping arrangement for a power tool of claim 11, wherein said clamp support member includes a conical recess and further wherein said locking member includes a conical portion adapted to seat in said conical recess when said locking member is engaged with the saw blade.

13. The saw blade clamping arrangement for a power tool of claim 11, wherein said biasing member comprises a spring clamp member having a first end constrained with respect to said clamp support.

14. The saw blade clamping arrangement for a power tool of claim 13, wherein said spring clamp member further includes a second end displaceable by said actuation member.

15. The saw blade clamping arrangement for a power tool of claim 14, wherein said actuation member comprises a release lever pivotally attached to the power tool.

16. The saw blade clamping arrangement for a power tool of claim 14, wherein said spring clamp member further includes an elongated slot disposed adjacent said second end, and wherein said locking member includes a reduced diameter portion adapted to translate within said elongated slot as said second end is displaced by said actuation member.

17. The power reciprocating saw of claim 6, wherein said biasing member comprises a spring clamp member having a first end constrained with respect to said clamp support member.

18. The power reciprocating saw of claim 6, wherein said actuation member comprises a release lever pivotally attached to said housing for pivotal movement between said first position and said second position.

19. A saw blade clamping arrangement for a power tool of the type including a housing, a drive shaft mounted for reciprocating motion relative to the housing, and a saw blade releasably interconnected with the drive shaft, the saw blade clamping arrangement comprising:

a clamp support interconnected with the drive shaft and including a conical recess;

a locking member selectively engageable with the saw blade to operatively interconnect the saw blade with the drive shaft, said locking member including an end for selectively engaging the saw blade;

an actuation member attached to the power tool, said actuation member moveable between a first position in which the locking member operatively interconnects the saw blade with the drive shaft and a second position in which the locking member permits displacement of the saw blade relative to the drive shaft; and a spring clamp member for biasing said locking member into engagement with the saw blade, said spring clamp member having a first end constrained with respect to said clamp support, a second end displaceable by said actuation member, and an elongated slot disposed adjacent said second end;

said locking member including a conical portion adapted to seat in said conical recess when said locking member is engaged with the saw blade.

20. The saw blade clamping arrangement of claim 18, wherein said actuation member is a release lever mounted for pivotal movement about a pivot axis.

* * * * *

UNITED STATES PATENT AND TRADEMARK OFFICE
CERTIFICATE OF CORRECTION

PATENT NO. : 5,794,352
DATED : August 18, 1998
INVENTOR(S) : Stephen C. Dassoulas It is certified that error appears in the above-identified patent and that said Letters Patent is hereby corrected as shown below:

On the Title Page, under "References Cited", "U.S. Patent Documents",
  "2,101,362  3/1937  Davidson" should be --2,101,362  3/1930  Davidson--.

Column 13, line 17, claim 13,
  "claim 11" should be --claim 10--.

Signed and Sealed this

Twenty-eighth Day of March, 2000

Attest:

Q. TODD DICKINSON

Attesting Officer   Commissioner of Patents and Trademarks